US006348002B1

(12) United States Patent
Breese

(10) Patent No.: US 6,348,002 B1
(45) Date of Patent: Feb. 19, 2002

(54) SLIP YOKE SEALING AND POSITIONING PLUG

(75) Inventor: Douglas E. Breese, Northwood, OH (US)

(73) Assignee: Spicer Driveshaft, Inc., Holland, OH (US)

(*) Notice: Subject to any disclaimer, the term of this patent is extended or adjusted under 35 U.S.C. 154(b) by 0 days.

(21) Appl. No.: 09/512,010

(22) Filed: Feb. 24, 2000

(51) Int. Cl.$^7$ ................................................ F16C 3/00
(52) U.S. Cl. .................... 464/182; 29/428; 29/522.1; 29/509; 464/135; 464/162; 403/359.5
(58) Field of Search .................. 464/135, 162, 464/182, 134; 403/359.1, 359.5; 29/522.1, 509, 511

(56) References Cited

U.S. PATENT DOCUMENTS

| 1,541,007 A | | 6/1925 | Thiemer | |
| 2,107,721 A | | 2/1938 | Swenson | |
| 2,116,290 A | | 5/1938 | Spicer | |
| 2,198,654 A | | 4/1940 | Calkins et al. | |
| 2,239,192 A | * | 4/1941 | Cutting | 464/162 |
| 3,123,990 A | | 3/1964 | Freeman | |
| 3,234,758 A | | 2/1966 | Lewis | |
| 3,813,899 A | | 6/1974 | Abrahamer | |
| 4,057,885 A | * | 11/1977 | Giger et al. | 29/509 |
| 4,431,334 A | * | 2/1984 | Cleveland et al. | 464/134 |
| 4,475,737 A | | 10/1984 | Cook, Jr. et al. | |
| 4,805,280 A | * | 2/1989 | Elander et al. | 29/509 |
| 5,562,546 A | * | 10/1996 | Koslowski et al. | 403/359.5 |
| 5,735,747 A | * | 4/1998 | Gehrke et al. | 464/162 |
| 5,797,800 A | * | 8/1998 | Rhoades et al. | 464/130 |
| 5,836,823 A | | 11/1998 | Shellaberger | |
| 6,202,280 B1 | * | 3/2001 | Parker | 29/522.1 |

* cited by examiner

Primary Examiner—Lynne H. Browne
Assistant Examiner—Aaron Dunwoody
(74) Attorney, Agent, or Firm—MacMillan, Sobanski & Todd, LLC

(57) ABSTRACT

A slip yoke assembly includes a slip yoke having a barrel portion extending from a first end to a second end and a lug portion extending from the first end thereof. The barrel portion has a bore extending from the first end to the second end. The bore has a splined inner surface. The slip yoke assembly also includes a plug having a flange portion. The flange portion is attached to the first end of the barrel portion of the slip yoke. The plug also has a body portion which extends from the flange portion a predetermined distance into the bore. The slip yoke assembly also includes a shaft having an end portion disposed inside the bore of the slip yoke. The end portion includes an end which abuts the body portion of the plug. The end portion of the shaft has a splined outer surface which cooperates with the splined inner surface of the slip yoke bore to provide a rotatable connection between the shaft and the slip yoke while allowing a limited amount of relative axial movement therebetween.

15 Claims, 4 Drawing Sheets

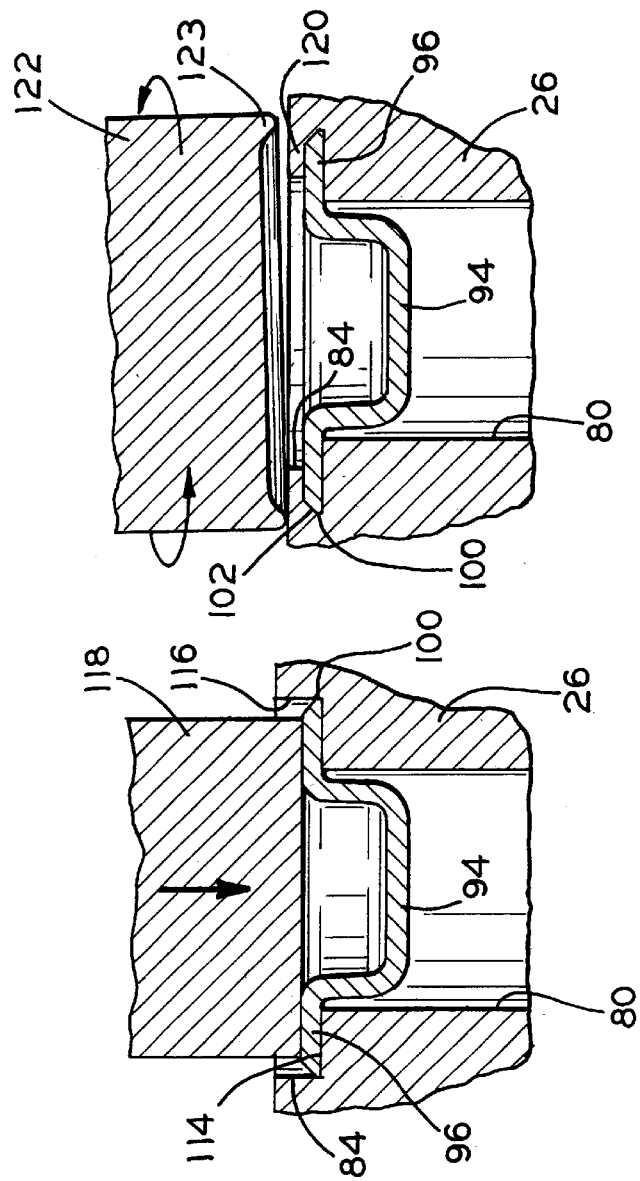
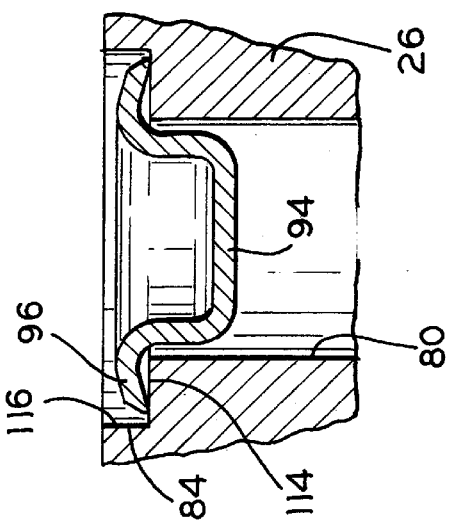

SLIP YOKE SEALING AND POSITIONING PLUG

BACKGROUND OF THE INVENTION

This invention relates in general to driveshaft assemblies for transferring rotational power from an engine/transmission assembly to an axle assembly in a vehicle drive train. In particular, this invention relates to an improved structure for a slip yoke assembly adapted for use in such a vehicular driveshaft assembly, wherein the slip yoke assembly including a sealing and positioning plug. This invention also relates to a method for installing the slip yoke assembly.

In most land vehicles in use today, a driveshaft assembly is provided for transmitting rotational power from an output shaft of a transmission to an input shaft of an axle assembly so as to rotatably drive one or more wheels of the vehicle. To accomplish this, a typical driveshaft assembly is connected between the transmission output shaft and the axle assembly input shaft. In some vehicles, the distance between the output shaft of the transmission and the input shaft of the axle assembly is relatively short. In these vehicles, the driveshaft assembly can include a single, elongated driveshaft tube. In other vehicles, the distance between the output shaft of the transmission and the input shaft of the axle assembly is relatively long, making the use of a single driveshaft tube impractical. In these vehicles, the driveshaft assembly can include a driveshaft tube, together with one or more coupling shafts. Multiple piece driveshaft assemblies of this general type have interior portions that are usually supported for rotation by one or more intermediate resilient support structures, which are generally referred to as center bearing assemblies.

The ends of the driveshaft assembly are connected to the output shaft of the transmission and the input shaft of the axle assembly by respective universal joints. Such universal joints are well known in the art and provide a rotational driving connection therebetween, while accommodating a limited amount of angular misalignment between the rotational axes of the various shafts. Not only must the driveshaft assembly accommodate a limited amount of angular misalignment, but it must also typically accommodate a limited amount of axial movement between the transmission output shaft and the axle assembly input shaft. A small amount of such relative axial movement frequently occurs when the vehicle is operated. To address this, it is known to provide one or more slip yokes in the driveshaft assembly.

In many instances, a slip yoke is provided between the output shaft of the transmission and the universal joint connected to the adjacent end of the driveshaft assembly. The transmission output shaft is typically formed as a generally cylindrical member including an end portion having a male splined outer surface. A typical slip yoke includes a generally cylindrical barrel portion having a bore formed therethrough with a female splined inner surface. The female splined inner surface of the barrel portion of the slip yoke cooperates with the male splined outer surface of the transmission output shaft to provide a rotatable driving connection between the slip yoke and the transmission output shaft, while allowing a limited amount of relative axial movement therebetween. The slip yoke further includes a lug portion comprising a pair of lug ears which extend from the end of the barrel portion. The lug ears have aligned openings formed therethrough that are adapted to receive portions of the universal joint therein. A welch plug or other sealing device is provided to close the end of the bore adjacent to the lug portion. The welch plug prevents the entry of dirt, water, and other contaminants into the region where the splined members engage one another, and further prevents transmission fluid from leaking out through the slip yoke.

In practice, the driveshaft assembly, including the driveshaft tube, the coupling tubes and center bearings (if necessary), the universal joints, and the slip yoke are often pre-assembled as a unit, generally referred to as a coupling shaft assembly, then shipped to another location for installation on the vehicle. To perform such installation, the slip yoke is connected to the output shaft of the transmission by sliding the barrel portion of the slip yoke onto the output shaft of the transmission such that the respective splines formed thereon cooperate with one another. When the slip yoke is properly positioned relative to the transmission output shaft, the center bearing assembly is fastened to the frame of the vehicle to fix the position of the driveshaft assembly.

During the installation process, it is important to properly position the slip yoke relative to the transmission output shaft. If the lug portion of the slip yoke is positioned too close to an external booted seal that is often mounted on the transmission housing, it may cause damage to the seal during operation of the vehicle. The proper positioning of the coupling shaft assembly is also important for the positioning of the remaining drive line components.

In the past, different methods have been used to properly position the slip yoke relative to the transmission output shaft. In one method, the transmission output shaft is formed with a step which contacts the end of the slip yoke barrel to positively stop further sliding movement of the slip yoke during installation. Unfortunately, this method requires that the slip yoke be formed having a relatively long barrel, undesirably increasing the weight and cost thereof. In another method, a groove is machined in the splined inner surface of the slip yoke bore, and a snap ring is installed in the groove. The snap ring contacts the end of the transmission output shaft to positively stop further sliding movement of the slip yoke. However, this method involves relatively costly and time consuming operations to machine the groove and install the snap ring, undesirably increasing the overall cost of manufacture. In yet another method, an instrument or fixture is used to locate the center bearing assembly relative to the vehicle frame. This method is also relatively time-consuming, and further is subject to operator error. Thus, it would be desirable to provide an improved structure for a slip yoke assembly that provides a positive stop for properly positioning the slip yoke relative to the transmission output shaft during assembly into a vehicle.

SUMMARY OF THE INVENTION

This invention relates to an improved structure for a slip yoke assembly adapted for use in a vehicular driveshaft assembly. The slip yoke assembly includes a slip yoke having a positioning plug provided therein. The slip yoke includes a barrel portion having a first end and a second end. A pair of lugs extends from the first end of the barrel portion. The barrel portion has a bore extending from the first end to the second end defining a female splined inner surface. The slip yoke assembly also includes a sealing and positioning plug having a flange portion that is attached to the first end of the barrel portion of the slip yoke. The plug also has a body portion that extends from the flange portion a predetermined distance inwardly into the bore. A shaft, such as a transmission output shaft, has an end portion that is disposed inside the bore of the slip yoke. The end portion includes an end which abuts the body portion of the plug. The end portion of the shaft has a male splined outer surface that cooperates with the female splined inner surface of the slip yoke bore to provide a rotatable connection between the shaft and the slip yoke, while allowing a limited amount of relative axial movement therebetween. The invention also relates to a sealing and positioning plug. The plug includes a flange portion having a chamfered outer edge. The flange portion defines a plane. The plug also includes a body portion that extends from the flange portion. The body portion extends a predetermined distance in a direction generally perpendicular to the plane of the flange portion. The invention further relates to a method of attaching a sealing and positioning plug to a slip yoke. A plug is provided including a flange portion and a body portion extending from the flange portion. A slip yoke is provided including a barrel portion having a first end and a second end, and a lug portion extending from the first end of the barrel portion. The barrel portion has a bore extending from the first end to the second end, the bore having a splined inner surface. The flange portion of the plug is positioned on the first end of the barrel portion of the slip yoke, and the body portion of the plug is positioned inside the bore. The material of the slip yoke is deformed over the flange portion of the plug to attach the plug to the slip yoke. The invention also relates to a method of installing a slip yoke on a shaft. A slip yoke is provided including a barrel portion having a first end and a second end, and a lug portion extending from the first end of the barrel portion. The barrel portion has a bore extending from the first end to the second end, the bore having a splined inner surface. A sealing and positioning plug is attached to the slip yoke. The plug includes a flange portion which is attached to the first end of the barrel portion of the slip yoke. The plug also includes a body portion which extends from the flange portion a predetermined distance into the bore. A shaft is provided having an end portion with a splined outer surface, the end portion including an end. The slip yoke is installed by telescopically inserting the barrel portion of the slip yoke about the end portion of the shaft until the end of the shaft abuts the body portion of the plug to provide a positive stop. The splined outer surface of the shaft cooperates with the splined inner surface of the slip yoke bore to provide a rotatable connection between the shaft and the slip yoke while allowing a limited amount of relative axial movement therebetween.

Various advantages of this invention will become apparent to those skilled in the art from the following detailed description of the preferred embodiment, when read in light of the accompanying drawings.

BRIEF DESCRIPTION OF THE DRAWINGS

FIGS. 7, 8, and 9 are sectional elevational views sequentially illustrating initial, intermediate, and final steps of a method for installing the sealing and positioning plug in a counterbore of the slip yoke in accordance with this invention.

DETAILED DESCRIPTION OF THE PREFERRED EMBODIMENT

Figure 1:
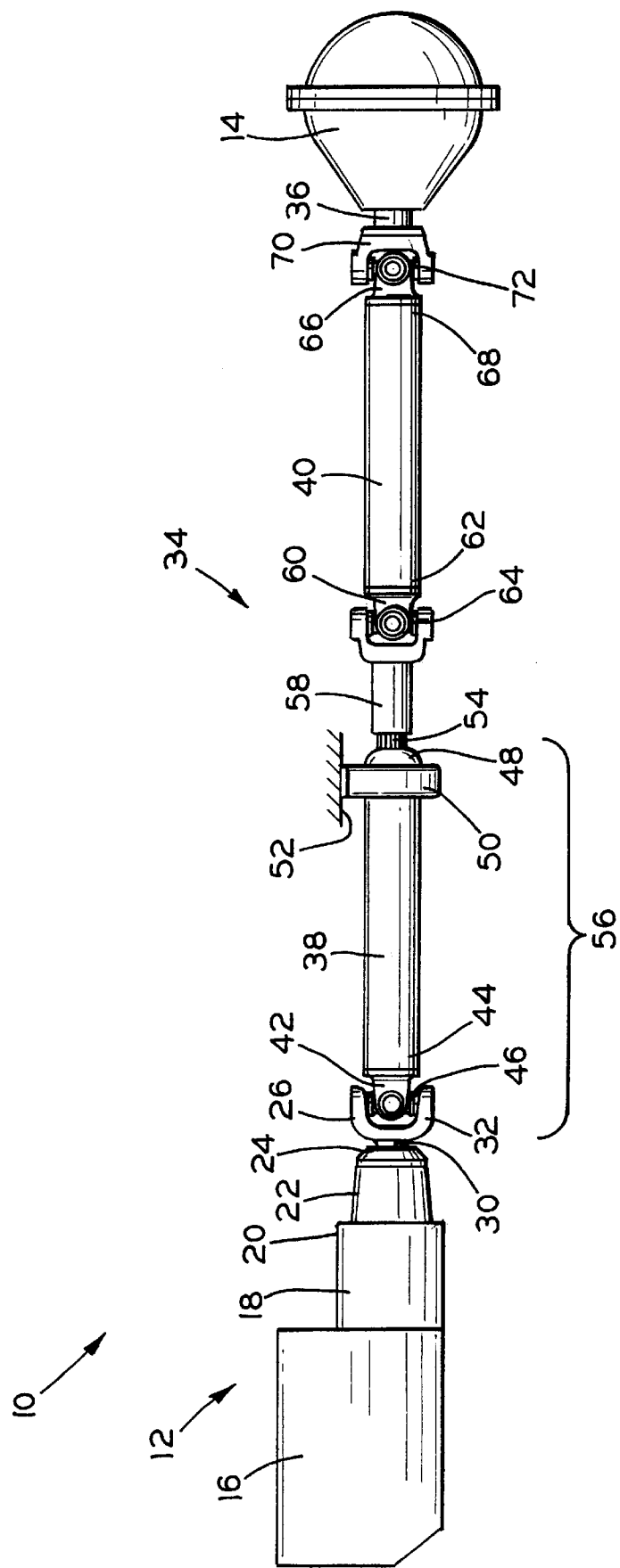
FIG. 1 is a side elevational view of a vehicle drive train assembly including a slip yoke assembly in accordance with this invention.

Referring now to the drawings, there is illustrated in FIG. 1 a vehicle drive train system, indicated generally at 10, in accordance with this invention. The drive train system 10 includes a conventional engine/transmission assembly 12, a conventional axle assembly 14, and a driveshaft assembly, indicated generally at 34, that is adapted to transmit rotational power therebetween so as to rotatably drive one or more vehicle wheels (not shown). The engine/transmission 12 assembly includes an engine 16 as the source of rotational power and a transmission 18 to transmit the rotational power at a selected gear ratio. The transmission 18 has a housing 20, including a portion generally referred to as a tailstock housing 22. An external booted seal 24 is mounted on the tailstock housing 22 to prevent the entry of dirt, water and other contaminants.

Figure 2:
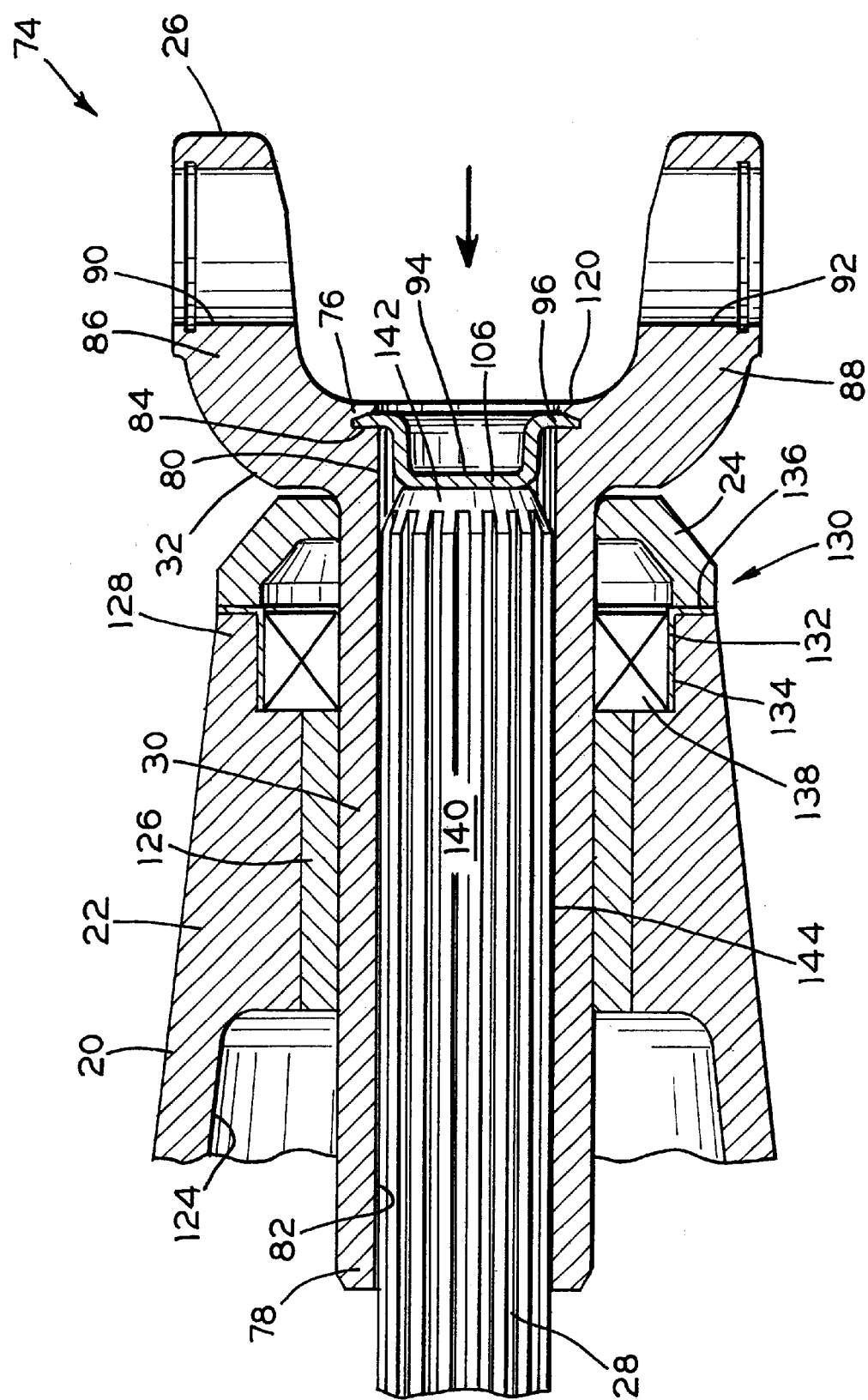
FIG. 2 is an enlarged sectional elevational view of the slip yoke assembly illustrated FIG. 1 including a sealing and positioning plug in accordance with this invention.

As best shown in FIG. 2, a slip yoke 26 in accordance with the invention is rotatably mounted on an output shaft 28 of the transmission 18. The slip yoke 26 extends into the tailstock housing 22 through the external seal 24. The slip yoke 26 includes a barrel portion 30 that is mounted on the transmission output shaft 28 and extends into the tailstock housing 22. The slip yoke 26 further includes a lug portion 32 that extends outside of the housing 22 and is spaced from the external seal 24. The slip yoke 26, the transmission output shaft 28, and the tailstock housing 22 are described in more detail below.

As mentioned above, the drive train system 10 includes a driveshaft assembly, indicated generally at 34, for transmitting rotational power from the transmission output shaft 28 to an input shaft 36 of the axle assembly 14. In the illustrated embodiment, the driveshaft assembly 34 is composed of a coupling shaft 38 and a driveshaft tube 40. A tube yoke 42 is attached to a first end 44 of the coupling shaft 38. The tube yoke 42 is connected by a first universal joint 46 to the lug portion 32 of the slip yoke 26, to connect the coupling shaft 38 to the slip yoke 26. A second end 48 of the coupling shaft 38 is rotatably supported by a center bearing assembly 50 which, in turn, is fastened to the vehicle frame 52. In the illustrated embodiment, a male splined slip shaft 54 is provided on the second end 48 of the coupling shaft 38. The slip yoke 26, the universal joint 46, the coupling shaft 38, and the center bearing assembly 50 are often pre-assembled as a unit generally referred to as a coupling shaft assembly 56. The coupling shaft assembly 56 is installed in the vehicle by sliding the barrel portion 30 of the slip yoke 26 onto the transmission output shaft 28 until the slip yoke 26 is properly positioned, and then fastening the center bearing assembly 50 to the vehicle frame 52 to fix the position of the coupling shaft assembly 56. The installation of the slip yoke 26 on the transmission output shaft 28 is described in more detail below.

The male splined slip shaft 54 provided on the second end 48 of the coupling shaft 38 is connected to a female splined second slip yoke 58. A tube yoke 60 is attached to a first end 62 of the driveshaft 40. The second slip yoke 58 is connected to the tube yoke 60 by a second universal joint 64. Another tube yoke 66 is attached to a second end 68 of the driveshaft 40. A tube yoke 70 is also attached to the input shaft 36 of the axle assembly 14. The tube yokes 66 and 70 are connected by a universal joint 72 to connect the driveshaft 40 to the input shaft 36 of the axle assembly 14. Thus, the driveshaft assembly 34 provides a rotational driving connection between the output shaft 28 of the transmission 18 and the input shaft 36 of the axle assembly 14. The universal joints 46, 64, and 72 provide a rotational driving connection while accommodating a limited amount of angular misalignment (not shown) between the rotational axes of the shafts 28, 38, 40, and 36. The slip yokes 26 and 58 accommodate a limited amount of axial movement between the transmission output shaft 28 and the axle assembly input shaft 36.

Referring now to FIG. 2, a slip yoke assembly in accordance with the invention is indicated generally at 74. The slip yoke assembly 74 includes the above-described slip yoke 26, including the generally cylindrical having a first end 76 and a second end 78. A bore 80 extends from the first end 76 to the second end 78 of the barrel portion 30. The bore 80 has a female splined inner surface 82. In the illustrated embodiment, a counterbore 84 is formed in the first end 76 of the barrel portion 30. The slip yoke 26 also includes a lug portion 32 formed integrally with the first end 76 of the barrel portion 30. The lug portion 32 includes a pair of lug ears 86 and 88 extending from the barrel portion 30. The lug ears 86 and 88 have aligned openings 90 and 92 formed therethrough that are adapted to receive portions of the first universal joint 46 therein.

Figure 6:
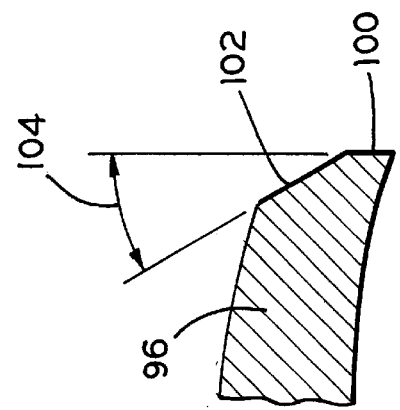
FIG. 6 is an enlarged sectional elevational view of a portion of an outer edge of the sealing and positioning plug illustrated in FIG. 5.
Figure 5:
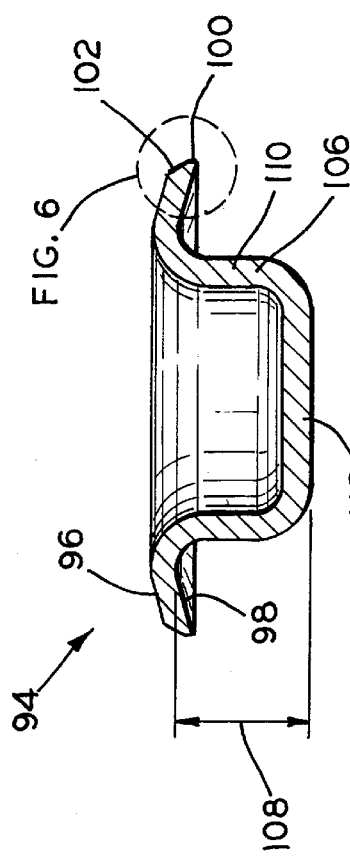
FIG. 5 is a sectional elevational view of the sealing and positioning plug taken along line 5—5 of FIG. 3.
Figure 3:
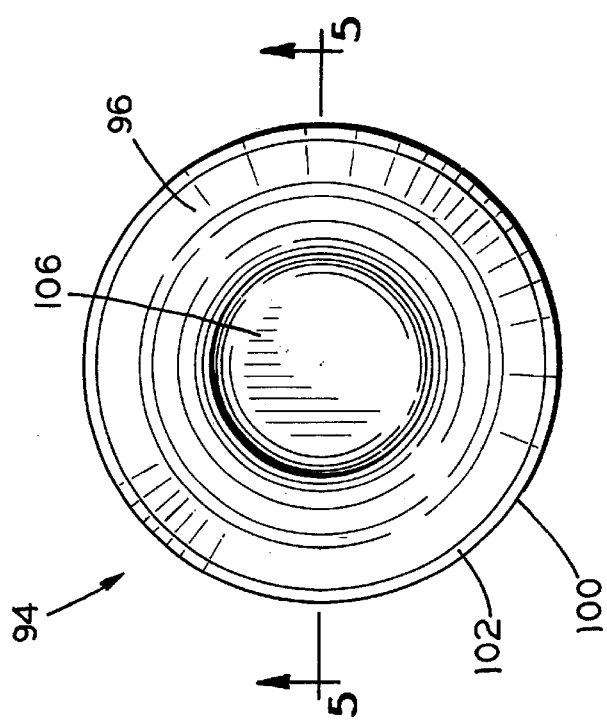
FIG. 3 is a top plan view of the sealing and positioning plug illustrated in FIG. 2.
Figure 4:
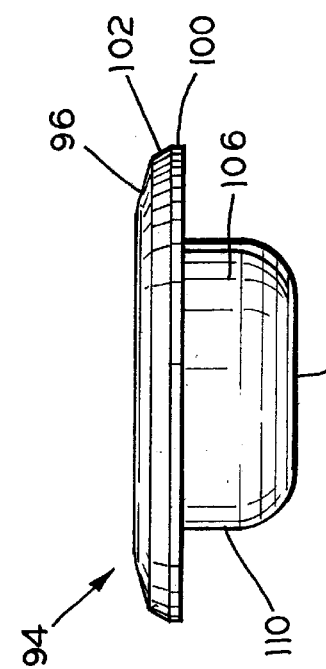
FIG. 4 is a side elevational view of the sealing and positioning plug illustrated in FIGS. 2 and 4.

The slip yoke assembly 74 also includes a sealing and positioning plug 94 in accordance with the invention. As best shown in FIGS. 3 through 5, the plug 94 is generally hat-shaped in cross section. The plug 94 includes a generally annular flange portion 96. Preferably, the flange portion 96 is arcuate or crowned in cross section, as best shown in FIG. 5. The flange portion has an inner surface 98. The flange portion 96 also has an outer edge 100. As best shown in FIG. 6, a chamfer 102 is formed in the outer edge 100 of the flange portion 96. Preferably, the chamfer 102 is formed at an angle 104 relative to the outer edge 100 within a range of from about twenty degrees to about sixty degrees. Preferably, the flange portion 96 has an outer diameter within a range of from about 0.75 inch to about 3.75 inches.

The plug 94 also includes a body portion 106 that extends away from the flange portion 96. Preferably, the body portion 106 is formed integrally with the flange portion 96. The body portion 106 has an axial length 108. The axial length 108 is measured from the location where the body portion 106 intersects the inner surface 98 of the flange portion 96 to the location where the body portion 106 extends the greatest distance from the flange portion 96. Preferably, the axial length 108 of the body portion 106 is within a range of from about 0.18 inch to about 1.25 inches, and more preferably from about 0.375 inch to about 1.00 inch. The purpose of the axial length 108 will be described below. The body portion 106 can be practically any shape so long as it has a suitable axial length 108. In the illustrated embodiment, the body portion 106 is generally cylindrical in shape, including a generally cylindrical sidewall 110 and a generally circular end wall 112. The shape of the plug 94 of the invention is significantly different from the shape of conventional sealing plugs such as welch plugs, which are generally flat or slightly domed in shape.

Preferably, the plug 94 is formed from a relatively strong, rigid material, such as a metallic or plastic material. Some suitable metals include steel, aluminum, and alloys thereof. More preferably, the plug 94 is formed from steel. The plug 94 can be formed by any suitable method, such as a stamping operation.

As shown in FIG. 2, the plug 94 is attached to the first end 76 of the barrel portion 30 of the slip yoke 26. In the illustrated embodiment, the flange portion 96 of the plug 94 is seated in the counterbore 84 in the first end 76 of the barrel portion 30, and is attached therein. FIGS. 7 through 9 illustrate a preferred method of attaching the plug 94 in the counterbore 84. As shown in FIG. 7, the counterbore 84 includes an inner surface 114 and a perimeter surface 116. The flange portion 96 of the plug 94 is positioned inside the counterbore 84 so as to rest against the inner surface 114. The flange portion 96 is spaced a short distance from the perimeter surface 116 of the counterbore 84. The flange portion 96 is arcuate in cross section when it is first placed in the counterbore 84.

As shown in FIG. 8, a press 118 is used to force the flange portion 96 of the plug 94 against the inner surface 114 of the counterbore 84. This causes the flange portion 96 to flatten out and expand in a radially outward direction. The outer edge 100 of the flange portion 96 is forced radially outwardly against the perimeter surface 116 of the counterbore 84 to form a tight seal around the perimeter of the flange portion 96. Then, as shown in FIG. 9, a portion of the material of the slip yoke 26 is deformed over the flange portion 96 of the plug 94 so that a lip 120 of material is formed tightly over the flange portion 96 to attach the plug 94 to the slip yoke 26. The chamfer 102 on the outer edge 100 of the flange portion 96 increases the strength of the attachment. The material of the slip yoke 26 can be deformed over the flange portion 96 by any suitable method. Preferably, the material is deformed over the flange portion 96 by a staking operation. In the illustrated embodiment, the staking operation is performed by an orbital forming device 122. The orbital forming device 122 is a tilted cylinder which rolls around on its edge 123 in an orbital fashion about the counterbore 84, under pressure, to deform the material of the slip yoke 26 over the flange portion 96.

Referring again to FIG. 2, the transmission housing 20 includes a portion generally referred to as a tailstock housing 22. The tailstock housing 22 has an opening 124 formed therethrough. A bearing 126 is mounted in the opening 124. The tailstock housing 22 includes an outer end 128. A seal assembly 130 is mounted on the outer end 128 of the tailstock housing 22. The seal assembly 130 includes a ring 132 that is press fit into the opening 124 to secure the seal assembly 130 to the tailstock housing 22. The ring 132 is usually formed from a metallic material. The ring 132 is L-shaped in cross section, including an inner leg 134 which extends inside the opening 124 and an outer leg 136 which abuts the outer end 128 of the tailstock housing 22. An internal seal 138 is attached to the inner leg 134 of the ring 132 inside the opening 124. An external booted seal 24 is attached to the outer leg 136 of the ring 132 and extends outside the tailstock housing 22. The seals 24 and 138 can be attached by any suitable means, such as adhesive. The seals 24 and 138 are formed from an elastomeric material, such as rubber. The transmission 18 includes an output shaft 28 having an inner end portion (not shown) that is supported for rotation in a conventional manner within the transmission housing 20. The output shaft 28 also has an outer end portion 140 including an outer end 142. The outer end portion 140 has a splined outer surface 144. The outer end portion 140 extends inside the opening 124 in the tailstock housing 22.

The slip yoke 26 is installed on the transmission output shaft 28 by telescopically inserting the barrel portion 30 of the slip yoke 26 about the outer end portion 140 of the transmission output shaft 28. The slip yoke 26 is pushed inward until the outer end 142 of the transmission output shaft 28 abuts the body portion 106 of the sealing and positioning plug 94 to provide a positive stop. The strengthened attachment of the plug 94 to the slip yoke 26 provided by the chamfer 102 prevents push-out of the plug 94 when it contacts the transmission output shaft 28. When the slip yoke 26 is installed, the splined inner surface 82 of the barrel portion 30 of the slip yoke 26 cooperates with the splined outer surface 144 on the outer end portion 140 of the transmission output shaft 28, to provide a rotatable driving connection between the slip yoke 26 and the transmission output shaft 28 while allowing a limited amount of relative axial movement therebetween.

The axial length 108 of the body portion 106 of the plug 94 determines the distance which the slip yoke 26 may travel before the transmission output shaft 28 contacts the plug 94. Thus, the sealing and positioning plug 94 provides a mechanism for quickly and easily positioning the slip yoke 26 relative to the transmission output shaft 28. The axial length 108 can be selected so that the slip yoke 26 is positioned at any desired location relative to the transmission output shaft 28 and the tailstock housing 22. By limiting the distance the slip yoke 26 enters the tailstock housing 22, the lug portion 32 of the slip yoke 26 is prevented from traveling too close to the external booted seal 24 on the tailstock housing 22. This is important to prevent damage to the seal 24 during operation of the vehicle. Conventional sealing plugs such as welch plugs have not been used to limit the travel of the slip yoke during installation. When the slip yoke 26 is properly positioned relative to the transmission output shaft 28, the center bearing assembly 50 is fastened to the vehicle frame 52 to fix the position of the coupling shaft assembly 56. Then, the remaining components of the drive line 34 are installed.

Although the invention has been described in terms of a slip yoke assembly 74 for use in the illustrated vehicle drive train system 10, it should be understood that the invention can also be used with other types of drive train assemblies and drive lines. Further, while the invention has been described as a slip yoke assembly 74 adapted for connection to a transmission output shaft 28, it should be understood that the slip yoke assembly 74 could be used with any type of shaft. The illustrated sealing and positioning plug 94 functions both to seal the slip yoke 26 from contaminants and to position the slip yoke 26 relative to the transmission output shaft 28. However, the sealing function is not critical to the invention, and another sealing device could be used in addition to the plug 94 to seal the slip yoke 26. Because the sealing and positioning plug 94 is used in place of a step on the transmission output shaft 28 to position the slip yoke 26, the barrel portion 30 of the slip yoke 26 shown in FIG. 2 could be shortened to reduce the material cost and weight.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A slip yoke and shaft assembly comprising:
   a slip yoke including a barrel portion having a first end and a second end and a lug portion extending from said first end of said barrel portion, said barrel portion having a bore formed therethrough extending from said first end to said second end, said bore having a splined inner surface;
   a plug including a flange portion attached to said first end of the barrel portion and a body portion extending from said flange portion a predetermined distance into said bore; and
   a shaft having a splined outer surface and including an end, said shaft being disposed in said bore such that splined outer surface cooperates with said splined inner surface, said end of said shaft abutting said body portion of said plug.

2. The slip yoke assembly defined in claim 1 wherein said flange portion has a chamfered outer edge.

3. The slip yoke assembly defined in claim 1 wherein said plug has a hat-shaped cross-section.

4. The slip yoke assembly defined in claim 1 wherein said flange portion is annular in shape and said body portion is generally cylindrical in shape with a closed end.

5. The slip yoke assembly defined in claim 1 wherein said flange portion is positioned in a counterbore formed in said first end of said barrel portion.

6. The slip yoke assembly defined in claim 1 wherein slip yoke is formed from a material, and wherein the flange portion of the plug is attached to the first end of the barrel portion of the slip yoke by a portion of the material of the slip yoke being deformed over the flange portion.

7. A method of installing a slip yoke on a shaft comprising the steps of:
   (a) providing a slip yoke including a barrel portion having a first end and a second end and a lug portion extending from the first end of the barrel portion, the barrel portion having a bore formed therethrough extending from the first end to the second end, the bore having a splined inner surface;
   (b) providing a plug including a flange portion and a body portion extending from the flange portion;
   (c) positioning the flange portion of the plug on the first end of the barrel portion such that the body portion of the plug extends a predetermined distance into the bore;
   (d) providing a shaft having a splined outer surface and an end, the end portion including an end; and
   (e) inserting the shaft within the bore of the barrel portion of the slip yoke until the end of the shaft engages the body portion of the plug, such that the splined outer surface of the shaft cooperates with the splined inner surface of the bore.

8. The method defined in claim 7 including the further step of deforming a portion of the slip yoke over the flange portion of the plug to attach the plug to the slip yoke.

9. The method defined in claim 8 wherein the material is deformed by a staking operation.

10. The method defined in claim 8 wherein the flange portion of the plug has a chamfered outer edge to facilitate the deforming of the material over the flange portion.

11. The method defined in claim 8 wherein the flange portion of the plug is positioned in a counterbore in the first end of the barrel portion.

12. The method defined in claim 4 wherein the flange portion of the plug is arcuate in cross section before the plug is attached to the slip yoke, and the method comprises an additional step, after positioning the plug and before deforming the material, of pressing the flange portion against an inner surface of the counterbore to straighten the flange portion and force an outer edge of the flange portion outwardly against a perimeter surface of the counterbore.

13. A method of manufacturing a slip yoke assembly comprising the steps of:
   (a) providing a slip yoke including a barrel portion having a first end and a second end and a lug portion extending from the first end of the barrel portion, the barrel portion having a bore formed therethrough extending from the first end to the second end, the bore having a splined inner surface;
   (b) providing a plug including a flange portion having a chamfered outer edge and a body portion extending from the flange portion;
   (c) positioning the flange portion of the plug on the first end of the barrel portion such that the body portion of the plug extends a predetermined distance into the bore; and
   (d) deforming a portion of the slip yoke over the chamfered outer edge of the flange portion of the plug to attach the plug to the slip yoke.

14. The method defined in claim 13 wherein the material is deformed by a staking operation.

15. The method defined in claim 13 wherein the flange portion of the plug is positioned in a counterbore in the first end of the barrel portion.

\* \* \* \* \*